UNITED STATES PATENT OFFICE.

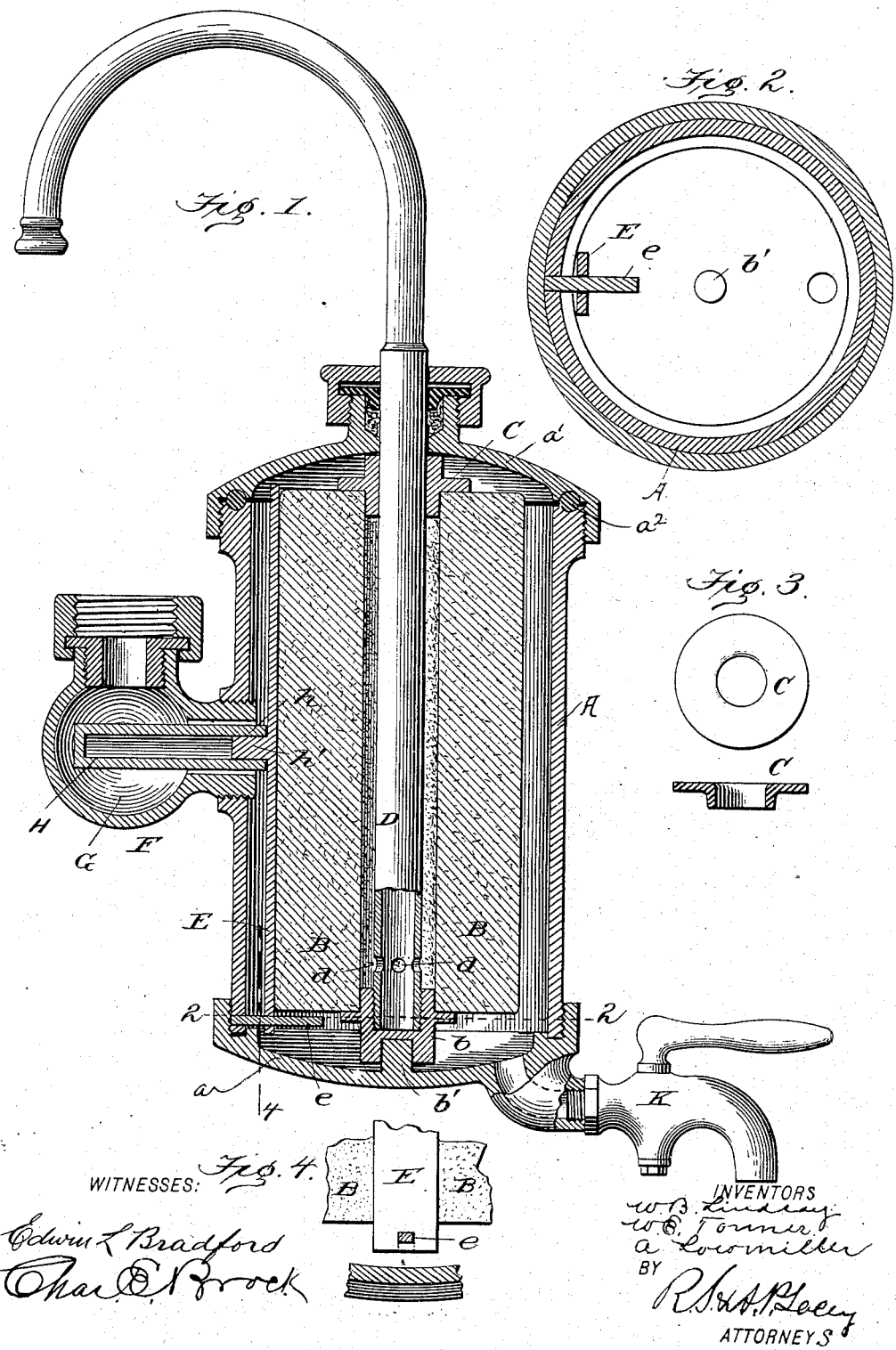

WILLIAM B. LINDSAY, WILLIAM E. TONNER, AND ALPHEUS LOWMILLER, OF STEUBENVILLE, OHIO.

FILTER AND CLEANER.

SPECIFICATION forming part of Letters Patent No. 565,760, dated August 11, 1896.

Application filed May 14, 1895. Serial No. 549,310. (No model.)

*To all whom it may concern:*

Be it known that we, WILLIAM B. LINDSAY, WILLIAM E. TONNER, and ALPHEUS LOWMILLER, of Steubenville, in the county of Jefferson, State of Ohio, have invented an Improved Filter and Cleaner, of which the following is a specification.

This invention relates generally to that class of filters known as "porous-wall," in which the water is passed through the walls of a porous cylinder or receptacle for the purpose of clarifying said water; and this invention relates particularly to the means for cleaning the exterior of said porous receptacle. Heretofore filters of this class have been constructed with revolving cleaners or scrapers, which were moved about the exterior of the filtering-receptacle to clean the outer surface, and filters have also been constructed in which the cleaner was made stationary and the receptacle revolved to contact therewith, and in both cases various adjusting devices have been devised for increasing or decreasing the pressure of the cleaner upon the filtering receptable or cylinder. These means of adjustment, however, have proved inconvenient and impracticable, as they are not usually understood or operated by any one except a skilled mechanic, and the filter is therefore liable to damage when handled by any one not thoroughly conversant with this class of filters. The object of our invention is to remedy all these defects and provide a cleaner in which the pressure can be regulated by the force of the water passing through the filter.

With this and such other objects as will appear hereinafter our invention consists in a peculiar construction of the various parts and the novel combination and arrangement of the various parts, as will be hereinafter more fully described, and pointed out in the claim.

In the drawings forming a part of this specification, Figure 1 is a central vertical sectional view of our improved filter. Fig. 2 is a horizontal section of the line 2 2 of Fig. 1. Figs. 3 and 4 show details of construction.

In carrying out our invention we employ an outer case A, having a bottom $a$ and a detachable cover $a'$, and between the top of case and cover we arrange a suitable packing-ring $a^2$. Within the outer case we arrange the porous filtering cylinder or receptacle B, which is preferably made of some porous material and at its lower end is provided with a nut or bearing $b$, which fits upon a central stud $b'$ in the center of the bottom of the outer case, thus supporting the filtering-cylinder at the center of the main case.

At the upper end of the cylinder B is arranged a collar C, through which extends a pipe D, said pipe extending nearly through the cylinder and being threaded into the nut or bearing $b$, arranged at the bottom of the cylinder. The upper end of the pipe D projects through the cover of the main case, and, if desired, may be surrounding by any suitable form of stuffing-box, gasket, or packing-rings.

The lower end of the pipe D is perforated, as shown at $d$, to permit the filtered water to enter said pipe, and the upper end of the pipe is curved or bent over, as shown, in order to discharge the water therefrom in a downward direction.

The pipe D being rigidly connected with the cylinder B through the medium of the nut $b$, said cylinder can be revolved whenever desired by simply turning the pipe D upon a central stud $b'$.

A metallic cleaner or rubber is arranged out near the main case at one side of the cylinder B, and bears against said cylinder at that point. This cleaner or rubber consists of a flat plate E, of hard metal, and at its lower end is slotted to straddle a guide-pin $e$, which is rigidly attached to one side of the case near the bottom of the same and rests below the cylinder B. This guide-pin supports the cleaner E, and inasmuch as said cleaner is solid at its lower end, where it bears upon the guide-pin, the plate can be moved back and forth without being disengaged from its proper position.

The water-supply pipe F is connected with the outer casing at a point about midway its length and directly opposite the cleaner E, said pipe being preferably constructed with a chamber G, where it connects with the main casing, and arranged near said chamber is a hollow piston H, which nearly fills the pipe F where it meets the casing A. Within the inner end of this hollow piston H is inserted lug $h'$, formed upon the cleaner-plate E. By this arrangement the water, in passing through the pipe F into the casing A, will exert a certain amount of pressure upon the outer end of the piston H, and thereby force the cleaner against the filtering cylinder or chamber G, and by increasing or decreasing the pressure of the water the pressure of the cleaner upon the cylinder can be increased or decreased, as desired.

The draw-off faucet K is connected with the bottom of the main casing A, through which water can be drawn at any time, and in cleaning the filter this faucet will, of course, be opened.

Now, in operation, the water passes through the supply-pipe into the main casing A, from which it passes through the porous wall of the cylinder into said cylinder and out through the pipe D. The normal pressure of the water will tend to hold the metallic cleaner against the porous cylinder, and whenever it is desired to clean the outer surface of said cylinder from the sediment which has collected thereon it is only necessary to revolve said cylinder by turning the discharge-pipe upon its axis. The draw-off faucet is of course open at this time, and the sediment can be drawn from the main case A. The filtering operation can then be resumed, and whenever it is desired to clean the cylinder upon its exterior it is only necessary to revolve the same, so that the cleaner or rubber will scrape this exterior, and by increasing the pressure of the amount of the water-flow any desired pressure can be had upon the cleaner or rubber.

Having thus described our invention, what we claim as new, and desire to secure by Letters Patent, is—

In a filter of the class described, the combination, with an outer case, having a bottom provided with a central stud, of the porous filtering-cylinder, having a socketed plug arranged in its bottom, and adapted to seat upon the central stud, a discharge-pipe leading from said filtering-cylinder, a metallic cleaner-plate arranged between the outer case, and the filtering-cylinder, said cleaner being adapted to bear against the outer surface of said filtering-cylinder, said plate being slotted at its lower end, a guide-pin attached to the outer case, and upon which the cleaning-plate slides, the lug formed upon said plate about midway its length, the discharge-pipe tapped into the side of the outer case, opposite said lug, the said pipe being constructed with a chamber G, and the hollow piston located in said chamber, having a socket at its forward end to receive the lug upon the cleaner-plate, the rear end of said piston being closed to receive pressure of the water thereon, substantially as shown and described.

In testimony whereof we affix our signatures, in the presence of two witnesses, this 11th day of May, 1895.

WILLIAM B. LINDSAY.
WILLIAM E. TONNER.
ALPHEUS LOWMILLER.

Witnesses:
THOS. B. LINDSAY,
H. H. FICKES.